Patented Jan. 14, 1947

2,414,326

UNITED STATES PATENT OFFICE 2,414,326

CLEANING FILTER CLOTH

James W. Newsome, Belleville, Ill., assignor to Aluminum Company of America, Pittsburgh, Pa., a corporation of Pennsylvania No Drawing. Application January 19, 1944, Serial No. 518,909

2 Claims. (Cl. 8—137)

This invention relates to a method of treating cloth filters which have been used to separate aluminate solution from insoluble residues contained therein.

It is common practice, in the art of removing alumina values from ores containing the same, to treat the ore to solubilize the alumina values in the form of an aluminate solution, while leaving the silica, iron and other impurities in large part undissolved. Thereafter the aluminate solution is separated from the undissolved impurities by a filtering operation. In such operations it is customary to use a press type or rotary type of filtering machine with a cloth filtering medium usually made of cotton fabric. As the filtering operation proceeds, the cloth finally becomes plugged or blinded by reason of the deposition in its pores of the insolubles from which the aluminate solution is being separated or of insolubles formed by secondary reactions in the filtrate. Eventually, therefore, the filter cloth must be replaced or cleaned. Constant replacement being expensive, it is desirable to reduce the amount of replacement necessary by the use of some cleaning operation by which the filtering cloth may be renewed and restored to an extent at least approaching its original filtering efficiency. The object of this invention is to provide such a treatment.

I have devised a process of cleaning filter cloth which has lost its filtering properties by reason of the filtering therethrough of aluminate solution, which process comprises the separate use, as a first step, of an acid selected from the class consisting of hydrochloric acid, nitric acid, formic acid, acetic acid, fluoboric acid and sulphuric acid, and the separate use, as a second step, of hydrofluoric acid. This process finds its greatest utility in the treatment of cloth which has been used to separate aluminate solution from highly siliceous residues, but it is useful whenever the residues are composed in part of silica or other siliceous substances. By this process a filter cloth can be successfully and effectively freed of the insoluble substances which plug or blind its pores and may thus be restored and ready for reuse in subsequent filtering operations.

The two step process which forms the subject of this invention is operated as a washing process, and the washing steps may be accomplished in any convenient manner, the controlling factor being one of cost. Thus aqueous solutions of the acids above named may be passed through the cloth in its normal position on the filtering machine or frame, or if this treatment requires too much volume of acid solution, or if the acid so handled would attack other parts of the filter, the cloth may be removed from the filter structure and treated in tanks of the acid.

Other ways of bringing the cloth into contact with the acid in order to effect a washing of the cloth will suggest themselves to persons skilled in the art. Similar considerations will control the strength of acid solution used. Very dilute concentrations have a certain advantage in not tending to injure the cloth as much as will more concentrated solutions. Likewise less concentrated solutions may not attack any metal parts of the filtering machine as strongly as do concentrated solutions if the washing treatment is carried out while the filter cloth remains in place on the machine or frame. On the other hand, the more concentrated acid solutions do the washing job somewhat more quickly and minimize the amount of solution which must be handled.

These and similar considerations are but those familiar in the handling of chemical solutions, and the invention is not predicated upon them. However, such considerations as these lead to my preference, in general, for solutions in the first step of washing which contain, if hydrochloric acid is used, from about 3 to 10 per cent by weight of that acid and, if sulphuric acid is used, from about 5 to 15 per cent by weight of that acid, if nitric acid, formic acid, acetic acid or fluoboric acid is used, from about 3 to 10 per cent by weight of the acid being used. In the second washing step I prefer to use concentrations of an aqueous solution containing about 3 to 10 per cent by weight of HF.

Referring now to the first washing step of my new process, I have found that while any of the acids mentioned may be used in this step, hydrochloric acid is superior in effect and is the one to be preferred. The other acids are preferred in the following order: nitric acid, formic acid, acetic acid, fluoboric acid, sulphuric acid. While these acids are, relatively speaking, satisfactory, they are substantially inferior to hydrochloric acid in their effect.

As an example of the operation of my process may be cited an instance where filter cloth which has been used to the point that it was no longer a satisfactory filter, was first submerged in a bath consisting of an aqueous solution containing 4 per cent by weight of hydrochloric acid and was thereafter submerged in a bath consisting of an aqueous solution containing 10 per cent by weight of hydrofluoric acid. In each case the strength of the acid was such that a treatment period of five minutes was satisfactory. The cloth after this treatment looked like a new cloth, despite the fact that prior to treatment it was stiff and dirty, and its filtering characteristics were substantially restored to those of a new cloth. The cloth in question, on which this treatment was carried out, had been used in the filtering of sodium aluminate solution produced by leaching with water the sinter produced from sintering low grade alumina or with limestone and soda ash, and the insoluble residues removed from the solution by the cloth contained very substantial amounts of siliceous material.

The critical order of the two washing steps is illustrated by the fact that on similar cloth when hydrofluoric acid was used in the first step and hydrochloric acid was used in the second step of washing, substantially no cleaning effect was obtained in so far as restoring the filter characteristics of the cloth is concerned. On similar cloth when hydrochloric acid alone was used in a single washing step, filtering characteristics were partly but by no means completely restored. When hydrofluoric acid alone was used as the washing medium, no restoration of filtering characteristics took place. When a mixture of 4 per cent hydrochloric acid and 10 per cent by weight of hydrofluoric acid was used the effect of the solution was approximately that obtained by the use of a solution containing 4 per cent of hydrochloric acid alone. Thus it will be seen that the cleaning effect which is produced in accordance with this invention is produced only when a two step washing is given the cloth and, in accordance with the invention, the first step comprises the use of an acid selected from the group above named.

Having thus described my invention, I claim:

1. The process of restoring the filtering characteristics of filter cloth which has been used to separate insoluble residues containing siliceous material from aluminate solution, which comprises as a first step washing the cloth in an aqueous solution of an acid selected from the group consisting of hydrochloric acid, sulphuric acid, nitric acid, formic acid, acetic acid and fluoboric acid and, as a second step, the washing of the cloth in a solution of hydrofluoric acid.

2. The process of restoring the filtering characteristics of filter cloth which has been used to separate insoluble residues containing siliceous material from aluminate solution, which comprises as a first step washing the cloth in a solution of hydrochloric acid and, as a second step, the subsequent washing of the cloth in a solution of hydrofluoric acid.

JAMES W. NEWSOME.